United States Patent [19]

Duke

[11] 4,218,826
[45] Aug. 26, 1980

[54] RADIAL ARM SAW ALIGNMENT TOOL

[76] Inventor: James G. Duke, P.O. Box 377, Imperial, Saskatchewan, Canada, S0G 2J0

[21] Appl. No.: 3,750

[22] Filed: Jan. 15, 1979

Related U.S. Application Data

[63] Continuation-in-part of Ser. No. 885,491, Mar. 24, 1978, abandoned.

[30] Foreign Application Priority Data

Nov. 8, 1977 [CA] Canada ................................ 290475

[51] Int. Cl.³ .............................................. G01B 5/25
[52] U.S. Cl. .............................. 33/185 R; 33/174 Q; 33/202
[58] Field of Search ............. 33/172 B, 174 Q, 185 R, 33/202

[56] References Cited

U.S. PATENT DOCUMENTS

| 595,370 | 12/1897 | Byer | 33/172 B |
|---|---|---|---|
| 1,832,511 | 11/1931 | Settem | 33/172 B |
| 2,242,151 | 5/1941 | Sisson | 33/172 B |
| 3,217,418 | 11/1965 | Wennerberg | 33/174 Q |
| 3,336,675 | 8/1967 | Wood | 33/185 R |

FOREIGN PATENT DOCUMENTS

| 843172 | 7/1952 | Fed. Rep. of Germany | 33/185 R |
|---|---|---|---|
| 551955 | 1/1923 | France | 33/172 B |

OTHER PUBLICATIONS

Sorenson, Chris, "Block Helps to Center Cutter Over Shaft for Keyway Milling", *American Machinist*, 4-2-2-1948.

Primary Examiner—Richard R. Stearns
Attorney, Agent, or Firm—Stanley G. Ade

[57] ABSTRACT

A gauge assembly for checking the alignment of radial arm saw blades relative to the saw table includes a base engageable within the saw fence guide slot with a vertical post extending upwardly from the base. A support arm is frictionally held upon the post for vertical sliding movement therealong and supports an indicator pointer pivoted to the support arm intermediate the ends of the pointer. One end of the pointer registers against an indicating plate or dial and the other end is provided with a saw blade contacting portion which is adjustable for contact with the blade surface. The gauge assembly can be used to check the perpendicular positioning of the blade relative to the table and the fore and aft parallel relationship of the blade to the table when the blade is vertical. It can also check the horizontal parallelism of the blade with respect to the surface of the table when the blade is turned horizontally.

6 Claims, 5 Drawing Figures

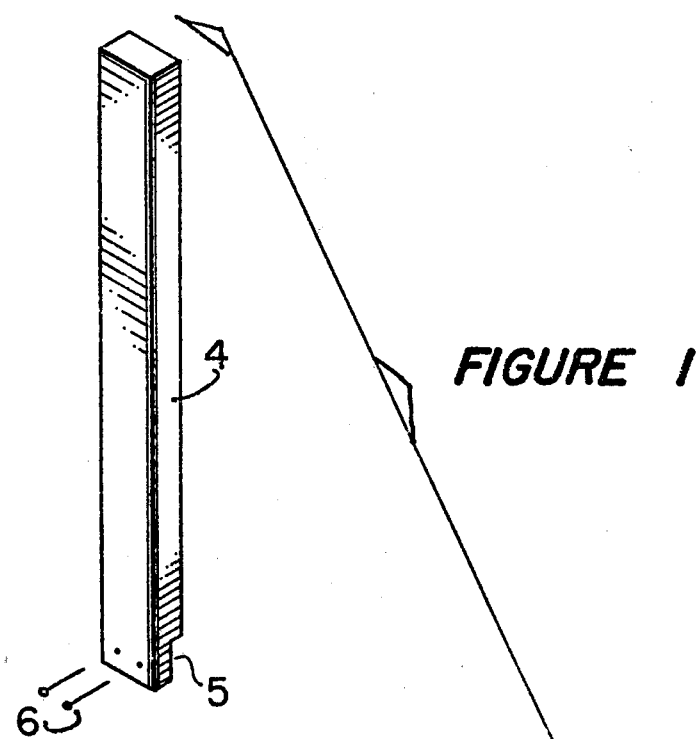
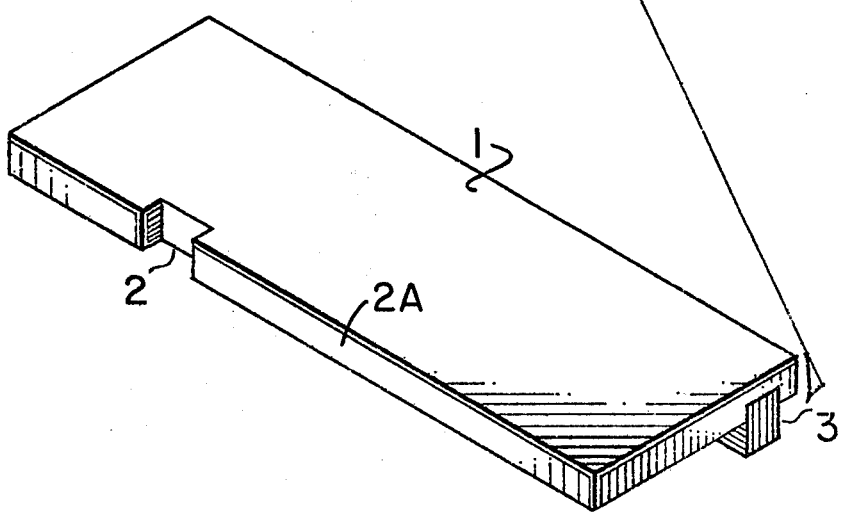
FIGURE 1

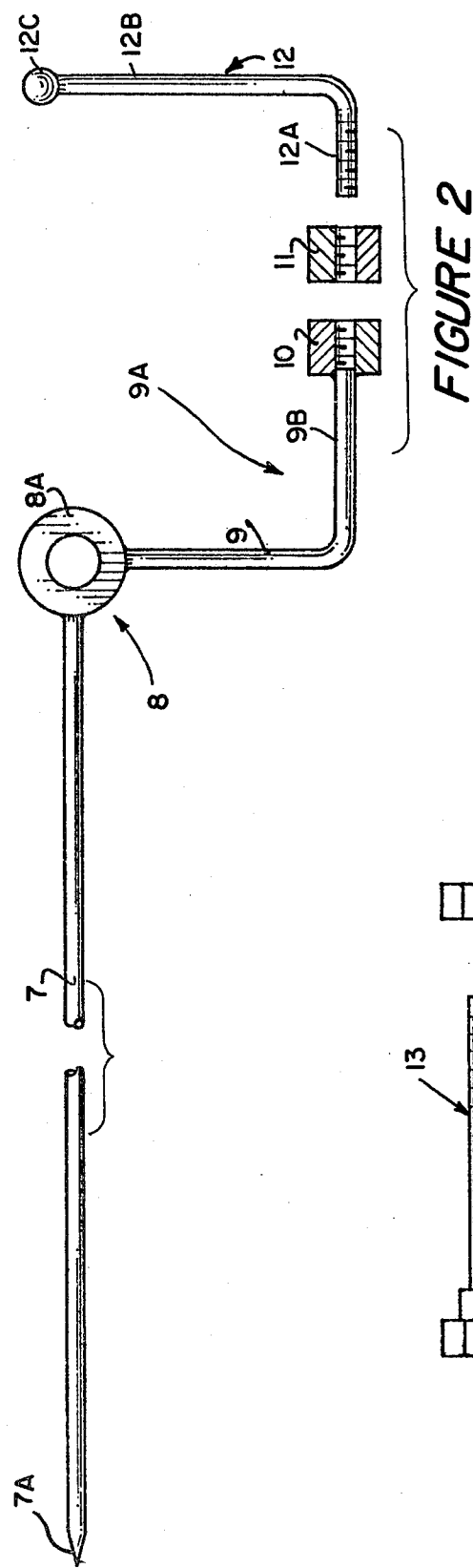
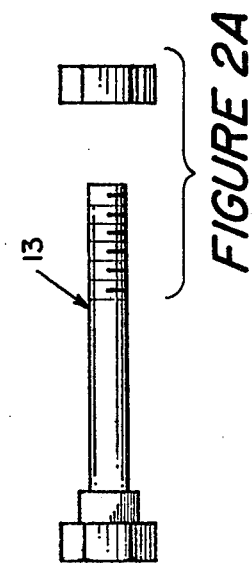

RADIAL ARM SAW ALIGNMENT TOOL

This is a continuation-in-part of application Ser. No. 885,491, now abandoned, filed Mar. 24, 1978.

BACKGROUND OF THE INVENTION

This invention relates to a gauge assembly for checking and facilitating the alignment of radial arm saw blades relative to the table.

It is common when aligning radial arm saw blades to use a trial and error method to determine the correct alignment and this method is very time consuming and requires a considerable degree of skill to achieve perfect alignment.

It will be appreciated that when the saw blade is in the normal vertical position, it is necessary to check the alignment of the upper side and the lower side of the blade relative to the table to ensure correct perpendicular relationship and also to check the fore and aft parallelism of the blade to the table, particularly the fence slot thereof.

When the blade is turned through 90° so that it lies horizontally to the table, it is desirable and necessary to check the parallelism of the blade to the table both fore and aft and from side to side.

SUMMARY OF THE INVENTION

Disadvantages inherent with common aligning methods are overcome by the present invention and one aspect of the invention consists of a gauge assembly for checking of the saw blade relative to the table, perpendicularly and fore and aft when said blade is situated perpendicular to the table and horizontally when said blade is situated horizontal to the table, said gauge assembly including a base, means on said base operatively engaging the associated fence slot in said table for fore and aft sliding movement relative to said table, a vertical support extending upwardly from said base and an indicating assembly mounted for selective vertical movement to said vertical support, said indicating assembly including a horizontal support extending parallel to said base and an indicating arm pivotally mounted intermediate the ends thereof to said horizontal support, said indicating arm having a saw blade face engaging end and a dial indicating finger as the other end, and a dial scale on said horizontal support traversed by said indicating finger.

Another advantage of the present invention is to provide a device of the character herewithin described which is easily engaged upon the saw table thus enabling the alignment of the saw blade to be checked easily and readily at any time. Furthermore, if the saw blade is found to be out of alignment, the gauge can be used to check the alignment as the necessary adjustments are being made as provided for in the operating manual accompanying radial arm saws.

A still further advantage of the invention is to provide a device of the character herewithin described which is simple in construction, economical in manufacture and otherwise well suited to the purpose for which it is designed.

With the foregoing in view, and other advantages as will become apparent to those skilled in the art to which this invention relates as this specification proceeds, the invention is herein described by reference to the accompanying drawings forming a part hereof, which includes a description of the preferred typical embodiment of the principles of the present invention, in which:

DESCRIPTION OF THE DRAWINGS

FIG. 1 is an isometric exploded view of the base and vertical support portion of the invention.

FIG. 2 is a partially exploded side elevation of the indicating arm per se.

FIG. 2A is an exploded side elevation of the pivot assembly for the indicating arm.

In the drawings like characters of reference indicate corresponding parts in the different figures.

DETAILED DESCRIPTION

Figure 3:
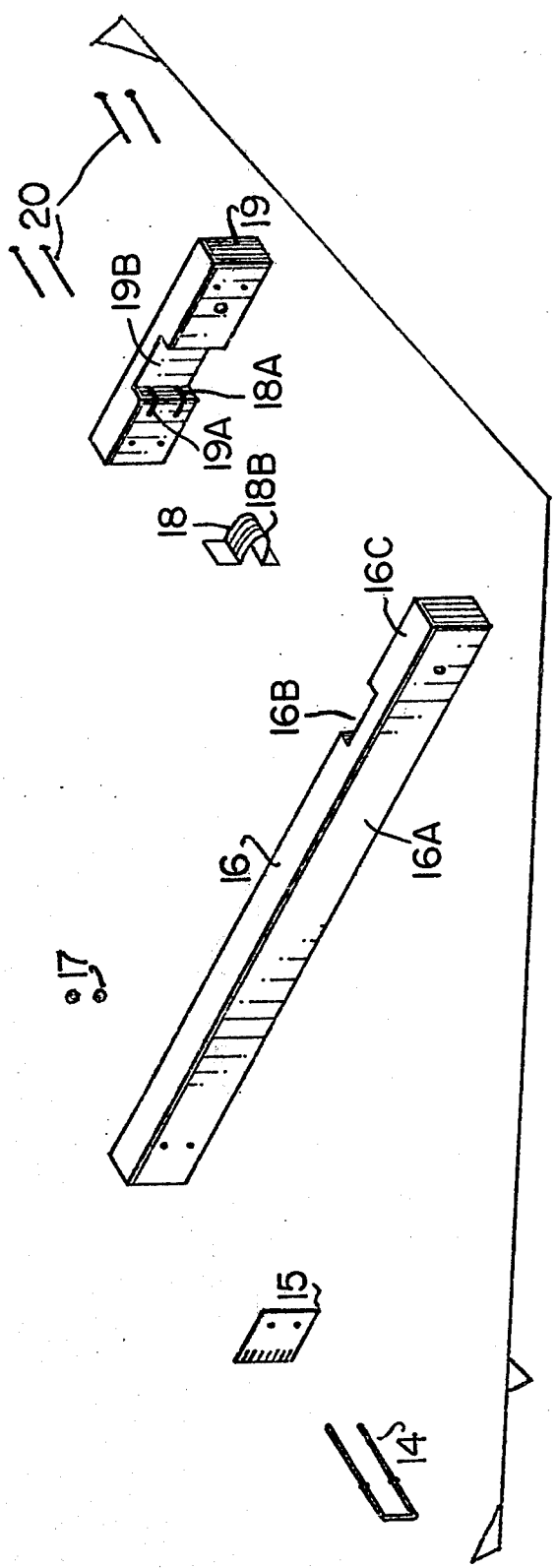
FIG. 3 is an exploded isometric view of the horizontal support per se.

Proceeding therefore to describe the invention in detail, reference character 1 illustrates a substantially rectangular base preferably manufactured of metal and having a cut-out portion 2 formed in one side edge 2A of the base as clearly shown in FIG. 1.

A longitudinally extending tongue 3 is secured to the underside of the base and extends from one end to the other and extends also below the lower surface of the base and is adapted to be slidably engageable within the fore and aft slot normally formed in the saw table of a radial arm saw (not illustrated) and in which the conventional fence engages and is locked.

A vertical support 4 is provided and extends upwardly from the side 2A of the base. This is provided with a cut-out portion 5 to engage the cut-out portion or recess 2 of the base and if the base is made from wood, then nails or pins 6 engage through the lower end of the support 4 and hold this vertical support firmly in position. However, if base and support are made from metal, then set screws (not illustrated) may be utilized for this purpose.

FIG. 2 illustrates an indicating pointer assembly collectively designated 8 which consists of a pivot boss 8A having a substantially horizontal dial indicating finger 7 extending from one side of the pivot boss 8A.

On the opposite side of the pivot boss 8A, there is situated a saw blade face engaging end portion collectively designated 9A and consists, in this embodiment, of a downwardly extending vertical portion 9, a horizontal portion 9B extending from the lower end of the vertical portion 9, and a saw blade face engaging portion 12 which includes the horizontal screw threaded portion 12A and a portion 12B which extends at an angle from the portion 12A. In the present embodiment, it will be noted that portions 12A and 12B are substantially at right angles to one another, but portion 12B preferably extends outwardly at an obtuse angle from portion 12A.

A nut portion 10 is secured to the distal end of the portion 9B into which the screw threaded portion 12A screw threadably engages so that the distal end 12C of the portion 12 can be situated radially with respect to the horizontal portion 9B and locked in position by means of lock nut 11 as clearly shown.

A pivot bolt assembly 13 shown in FIG 2A, engages through the pivot boss 8A and through one end of a horizontal support collectively designated 16 and shown in detail in FIG. 3. This support collectively designated 16, consists of a main portion 16A having a cut-out portion 16B on one side thereof and adjacent one end 16C thereof. A clamping portion 19 is also provided with a similar cut-out portion 19B and the cut-out portions 16B and 19B engage around the vertical support 4 with part 19 being attached to part 16 by means of nails or pins 20 if the parts are made of wood, and by bolts, rivets or the like (not illustrated) if parts are made from metal. The dimensions of the cut-out portions 16B and 19B are such that the horizontal support slides vertically upon the vertical support 4. A U-shaped spring portion 18 engages slot 18A formed in one wall of the cut-out portion 19B with the portion 18B of the spring bearing against one face of the vertical support 4 thus supplying spring friction to the support 4 and stabilizing the position of the horizontal component as it is moved upwardly and downwardly relative to the support. The spring holds it in the desired position once it has been moved.

Figure 4:
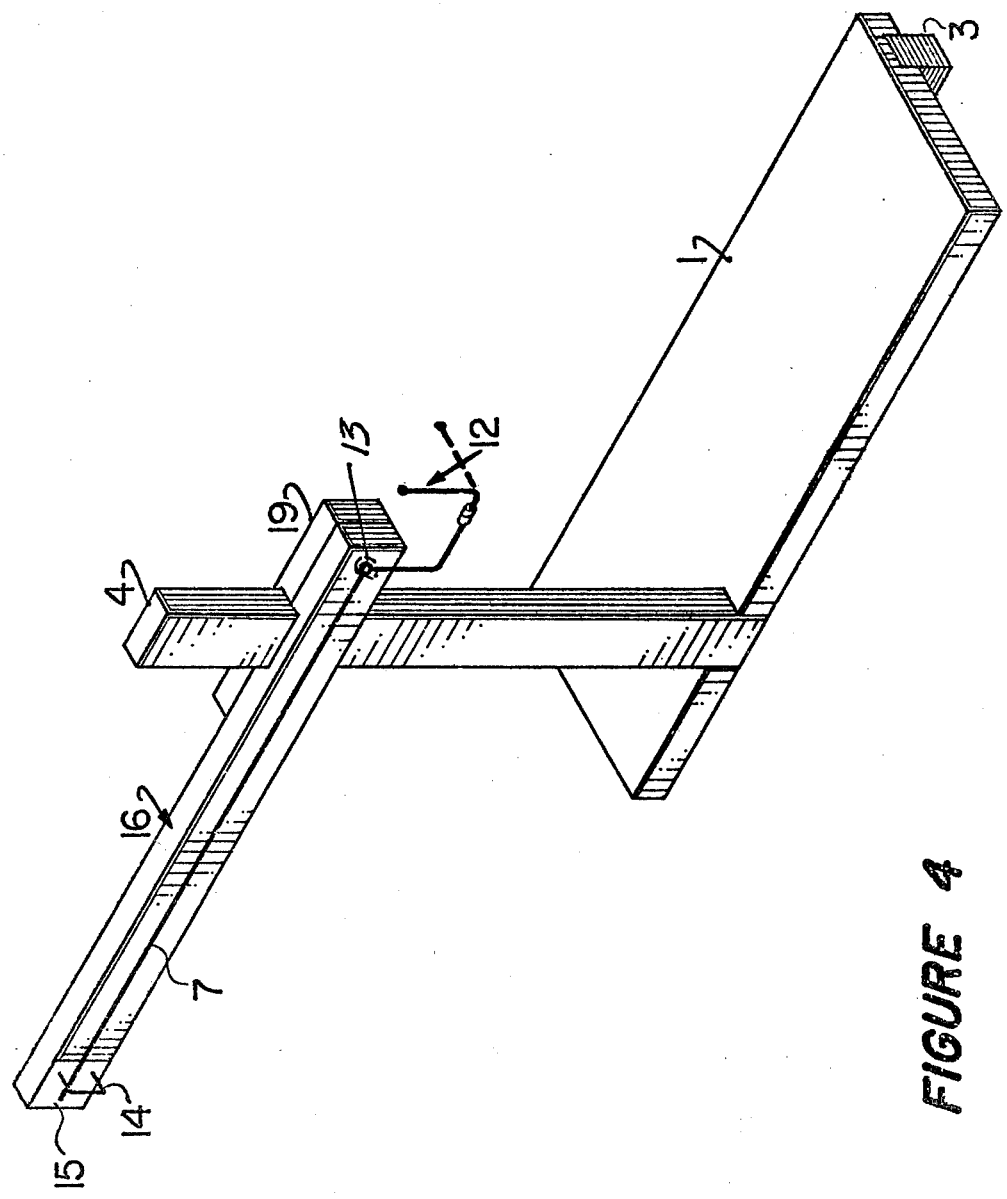
FIG. 4 is an isometric view of the device in the assembled position.

A dial plate 15 is secured to one face of the portion 16 adjacent the distal end thereof and a pointer retainer member 14, which is U-shaped, engages through the thickness of the portion 16 and is held in position by means of nuts 17 as shown in FIG. 4.

In operation, and assuming that the saw blade is in the vertical fore and aft position relative to the table, the assembly is engaged within the fence slot by means of the portion 3. It may be clamped in the desired position, if necessary, by means of conventional clamp means (not illustrated) provided in radial saw fence slots. The end 12C is positioned so that it contacts one face of the blade just below the other and in this connection the vertical positioning of the horizontal support is adjusted manually upon the vertical support 4. The assembly is situated within the fence slot so that the contacting portion 12C just touches the surface of the blade adjacent the leading side thereof. Adjustments are made to the positioning of the assembly so that the distal end 7A of the pointer portion 7 is zeroed relative to scale 15 whereupon the saw assembly is pulled forwardly on the radial arm so that the surface of the saw blade traverses past the contacting portion 12C. If the saw blade is parallel with the saw blade slot, the pointer portion 7A will remain opposite the zero mark on the dial plate 15, but if it is not, then deflection will show up and the saw blade can be adjusted until it is parallel with the fence slot.

The assembly is then adjusted so that the contacting portion 12C contacts the face of the blade at the lower side thereof just to one side of the other, once again ensuring that the pointer portion 7A is zeroed relative to the dial plate 15.

The horizontal support 16 is then moved upwardly on the vertical support 4 and once again if the blade is exactly perpendicular to the surface of the table, no deflection will show. However, if the blade is not exactly perpendicular, then the pointer portion 7A shows deflection relative to the dial plate 15.

The saw blade may then be turned so that it is parallel to the surface of the table and the portion 12 of the pointer assembly rotated so that it is in the position whereupon contacting portion 12C engages the under surface of the saw blade adjacent the front thereof. The portion 12 is then locked into position by means of lock nut 11 and once again the assembly is positioned so that the pointed portion 7A is zeroed relative to dial plate 15. The saw assembly is then pulled forward on the radial arm and if exactly parallel with the upper surface of the table, no deflection will be indicated. However, if it is not exactly parallel, then deflection will show and the necessary adjustment can be made.

It will therefore be appreciated that a relatively simple yet accurate gauge assembly is provided which enables the relationship of the saw blade to be checked relative to the table whether the saw blade is in the normal vertical position or in the horizontal position.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. For use with a radial arm saw which includes a table, a fence slot therein, a radial arm situated above said table and a saw blade operatively connected to the radial arm and being positionable in a vertical fore and aft relationship with the table when in the normal perpendicular position and parallel to the table when in a horizontal position; a gauge assembly for checking the alignment of the saw blade relative to the table, said gauge assembly including a base, means on said base operatively engaging the associated fence slot in said table for fore and aft sliding movement relative to said table, a vertical support extending upwardly from said base and an indicating assembly mounted for selective vertical movement to said vertical support, said indicating assembly including a horizontal support extending parallel to said base and an indicating arm pivotally mounted intermediate the ends thereof to said horizontal support, said indicating arm having a saw blade face engaging end and a dial indicating finger at the other end, said saw blade face engaging end being angularly adjustable, whereby the alignment of the saw blade relative to the table may be checked perpendicularly and fore and aft when said blade is situated perpendicular to the table and horizontally when said blade is situated horizontal to the table, and a dial scale on said horizontal support traversed by said indicating finger.

2. The gauge assembly according to claim 1 in which said indicator arm is pivoted to said support adjacent the saw blade face engaging end of said arm.

3. The gauge assembly according to claim 2 in which the portion of said arm between the point of pivotal attachment to said horizontal support and the saw blade face contacting end, includes a first portion extending down at right angles from the point of pivotal attachment, a horizontal portion extending from the lower end of said first portion, and a saw blade face contacting end portion extending at an angle from the horizontal portion.

4. The gauge assembly according to claim 3 which includes means to adjust the saw blade face engaging end radially relative to said horizontal portion, said last mentioned means including said horizontal portion having a screw threaded attachment for said saw blade face engaging portion and lock nut means to lock same in the desired angular relationship with said horizontal portion.

5. The gauge assembly according to claim 4 in which said horizontal support is slidable up and down said vertical support, and spring means operatively engaging between said horizontal and vertical supports for frictional holding said horizontal support in the desired position upon said vertical support.

6. The gauge assembly according to claims 1, 2 or 3 in which said horizontal support is slidable up and down said vertical support, and spring means operatively engaging between said horizontal and vertical supports for frictional holding said horizontal support in the desired position upon said vertical support.

* * * * *